United States Patent
Zou et al.

(10) Patent No.: US 10,558,694 B2
(45) Date of Patent: Feb. 11, 2020

(54) SEARCH METHOD AND APPARATUS

(71) Applicant: Baidu Online Network Technology (Beijing) Co., Ltd., Beijing (CN)

(72) Inventors: Hongjian Zou, Beijing (CN); Gaolin Fang, Beijing (CN); Jun Cheng, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 153 days.

(21) Appl. No.: 15/534,373

(22) PCT Filed: Nov. 30, 2015

(86) PCT No.: PCT/CN2015/096012
§ 371 (c)(1),
(2) Date: Jun. 8, 2017

(87) PCT Pub. No.: WO2017/020454
PCT Pub. Date: Feb. 9, 2017

(65) Prior Publication Data
US 2018/0137195 A1    May 17, 2018

(30) Foreign Application Priority Data
Aug. 3, 2015 (CN) .......................... 2015 1 0481932

(51) Int. Cl.
*G06F 16/00* (2019.01)
*G06F 7/00* (2006.01)
*G06F 16/33* (2019.01)

(52) U.S. Cl.
CPC ...... *G06F 16/3349* (2019.01); *G06F 16/3334* (2019.01); *G06F 16/3338* (2019.01)

(58) Field of Classification Search
CPC ........ G06F 16/24; G06F 16/33; G06F 16/835; G06F 16/951
(Continued)

(56) References Cited

U.S. PATENT DOCUMENTS 8,782,071 B1 * 7/2014 Mukherjee .......... G06F 16/9535
707/759
2009/0265328 A1 * 10/2009 Parekh .................. G06F 16/951
(Continued)

FOREIGN PATENT DOCUMENTS

| CN | 102012915 A | 4/2011 |
| CN | 102073684 A | 5/2011 |
| CN | 102637171 A | 8/2012 |

OTHER PUBLICATIONS

International Search Report corresponding to International Patent Application No. PCT/CN2015/096012, State Intellectual Property Office of the P.R. China, dated May 10, 2016; (2 pages).

*Primary Examiner* — Usmaan Saeed
*Assistant Examiner* — Raquel Perez-Arroyo
(74) *Attorney, Agent, or Firm* — Nixon Peabody LLP

(57) ABSTRACT

A search method and apparatus. A specific embodiment of the search method includes: finding a set of first time-effective search queries from a search log; selecting search queries meeting one of the following selection requirements as candidate time-effective search queries: included in the search log and semantically associated with the first time-effective search queries in the set of first time-effective search queries; included in the search log and containing a combination of preset keywords; processing the candidate time-effective search queries to obtain second time-effective search queries; performing search with a second time-effective search query, when a search query entered by the user matches the second time-effective search query. The present disclosure achieves obtaining the second time-effective search queries from the search queries of the search log based on the identified first time-effective search queries, thus raising the identification recall rate and further improving the identification effect of the time-effective search queries, on the condition that the identification accuracy is (Continued)

ensured in the identification process of the time-effective search queries.

10 Claims, 4 Drawing Sheets

(58) Field of Classification Search
USPC .......................................................... 707/706
See application file for complete search history.

(56) References Cited

U.S. PATENT DOCUMENTS

| | | | |
|---|---|---|---|
| 2012/0166439 A1* | 6/2012 | Poblete | G06F 16/958 707/737 |
| 2013/0282754 A1 | 10/2013 | Son | |
| 2014/0136532 A1* | 5/2014 | Ponte | G06F 16/313 707/730 |

* cited by examiner

400

```
┌─────────────────────────────────────────┐
│  finding out the set of first time-effective search   │  401
│         queries from a search log                     │
└─────────────────────────────────────────┘
                    ↓
┌─────────────────────────────────────────┐
│ selecting, based on the set of first time-effective search │
│ queries, search queries meeting one of the following selection │  402
│ requirements as candidate time-effective search queries: │
│ included in the search log and semantically associated with the │
│ first time-effective search queries in the set of first │
│ time-effective search queries;included in the search log and │
│ containing a combination of preset keywords │
└─────────────────────────────────────────┘
                    ↓
┌─────────────────────────────────────────┐
│ obtaining the second time-effective search queries from │  403
│ the candidate time-effective search queries, based on the │
│ semantic similarity and the historical time-effective │
│ search word and the preset verify word │
└─────────────────────────────────────────┘
                    ↓
┌─────────────────────────────────────────┐
│ performing search with a second time-effective search │  404
│ query, when a search query entered by the user matches │
│ with the second time-effective search query │
└─────────────────────────────────────────┘
```

Fig. 4

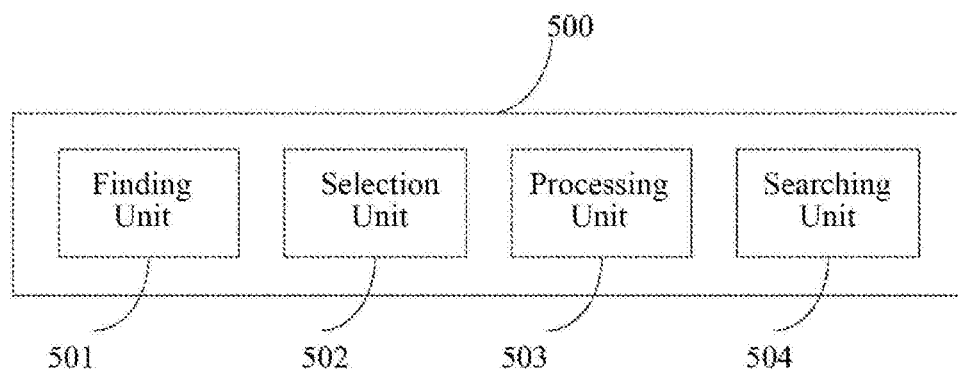

Fig. 5

SEARCH METHOD AND APPARATUS

CROSS-REFERENCE TO RELATED APPLICATION

This application is a U.S. National Stage of International Application No. PCT/CN2015/096012, filed Nov. 30, 2015, which is related to and claims the priority from Chinese Application No. 201510481932.7, filed on Aug. 3, 2015, the entire disclosures of which are hereby incorporated by reference in their entireties.

TECHNICAL FIELD

The present disclosure relates to the field of computer, specifically to the field of search, and more specifically to a search method and apparatus.

BACKGROUND

When performing a search, the user usually desires to obtain search results closer to the current time using the entered search query. Here, a search query returning search results having a publication time closer to the present time may be considered as a time-effective search query. By pre-identifying the time-effective search query, searched can be performed using the time-effective search query so that the returned search results may be more accurate, when the search query entered by the user contains a recognized time search query.

In conventional technology, the identification of the time-effective search query is mainly through two approaches: user behaviour identification and language model identification. Among them, the user behaviour identification mode identifies a search query of the search log with an inquiry frequency greater than a preset quantity threshold at a certain point as a time-effective search. The language model identification mode calculates the scores of the search query on different language models, and identifies a search with a score difference greater than a preset score threshold as a time-effective search. Next, in order to improve the identification accuracy, the above approaches need to raise their corresponding thresholds. At the same time, raising the corresponding thresholds will cause reducing of the identification recall rate, thus affecting the identification results of the time-effective search query.

SUMMARY

The present disclosure provides a search method and apparatus, in order to solve the technical problem mentioned in the foregoing Background section.

In a first aspect, the present disclosure provides a search method, comprising: finding a set of first time-effective search queries from a search log, wherein the search log is used to record search queries used by a user during a search, and a time-effective search query is a search query that when used for search, a difference between a publication time of a returned search result and the present time is less than a preset time difference threshold; selecting, based on the set of first time-effective search queries, search queries meeting one of the following selection requirements as candidate time-effective search queries: included in the search log and semantically associated with the first time-effective search queries in the set of first time-effective search queries; included in the search log and containing a combination of preset keywords, wherein preset keywords are words with occurrences in the set of first time-effective search queries more than a preset threshold, and the combination of preset keywords is generated by combining the preset keywords; processing the candidate time-effective search queries to obtain second time-effective search queries, the processing operation including one of the following: removing, from the candidate time-effective search queries, candidate time-effective search queries having semantic similarities with respect to the first time-effective search queries less than a preset threshold; removing, from a candidate time-effective search query, words with semantic relevance less than a preset correlation threshold with respect to the candidate time-effective search query; and performing search with a second time-effective search query, when a search query entered by the user matches the second time-effective search query.

In a second aspect, the present disclosure provides a search apparatus, comprising: a finding unit, configured to find a set of first time-effective search queries from a search log, wherein the search log is used to record search queries used by a user during a search, and a time-effective search query is a search query that when used for search, a difference between a publication time of a returned search result and the present time is less than a preset time difference threshold; a selection unit, configured to select, based on the set of first time-effective search queries, search queries meeting one of the following selection requirements as candidate time-effective search queries: included in the search log and semantically associated with the first time-effective search queries in the set of first time-effective search queries; included in the search log and containing a combination of preset keywords, wherein preset keywords are words with occurrences in the set of first time-effective search queries more than a preset threshold, and the combination of preset keywords is generated by combining the preset keywords; a processing unit, configured to process the candidate time-effective search queries to obtain second time-effective search queries, the processing operation including one of the following: removing, from the candidate time-effective search queries, candidate time-effective search queries having semantic similarities with respect to the first time-effective search queries less than a preset threshold; removing, from a candidate time-effective search query, words with semantic relevance less than a preset correlation threshold with respect to the candidate time-effective search query; a search unit, configured to perform search with a second time-effective search query, when a search query entered by the user matches the second time-effective search query.

By finding the set of first time-effective search queries from the search log, selecting the candidate time-effective search queries semantically associated with the first time-effective search queries in the set of first time-effective search queries and the candidate time-effective search queries containing the combination of preset keywords from the search queries of the search log, processing the candidate time-effective search queries to obtain a second time-effective search queries, the search method and apparatus provided by the present disclosure achieves obtaining the second time-effective search queries from the search queries of the search log based on the identified first time-effective search queries, thus raising the identification recall rate and further improving the identification effect of the time-effective search queries, on the condition that the identification accuracy is ensured in the identification process of the time-effective search queries.

BRIEF DESCRIPTION OF THE DRAWINGS

Other features, objectives and advantages of the present disclosure will become more apparent upon reading the detailed description to non-limiting embodiments with reference to the accompanying drawings, wherein:

FIG. 4 shows a flowchart of another embodiment of the search method according to the present disclosure;

FIG. 5 shows a schematic diagram of an embodiment of the search apparatus according to the present disclosure.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

In the embodiments of the present disclosure, the first time-effective search queries are search queries that have been identified as time-effective search queries, and the second time-effective search queries are new time-effective search queries obtained from the search log based on the first time-effective search queries, that is, the time-effective search queries recalled from the search log, on the basis of the first time-effective search queries.

Figure 1:
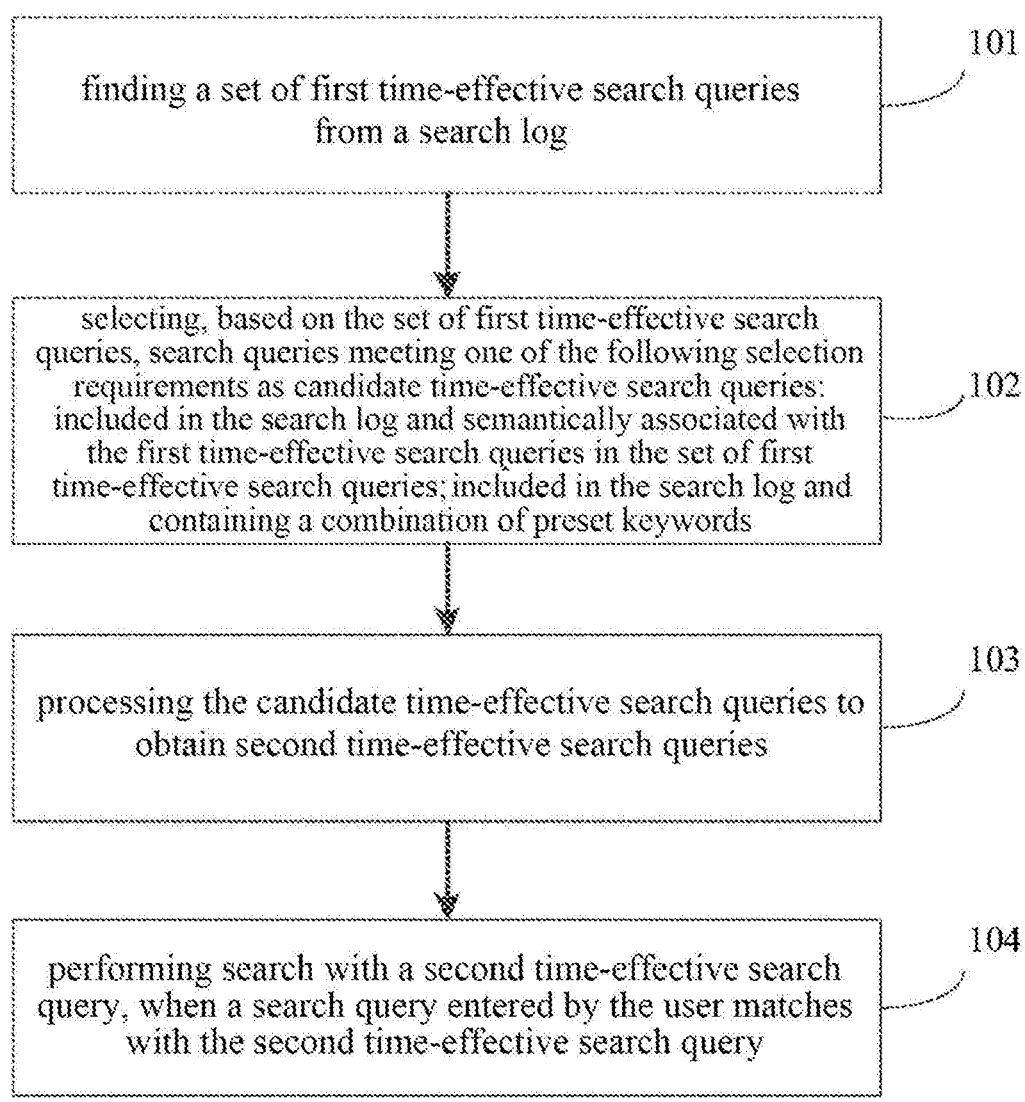
FIG. 1 shows a flowchart of an embodiment of a search method according to the present disclosure.

Referring to FIG. 1, a process 100 of an embodiment of a search method according to the present disclosure is shown. The method comprises the following steps:

Step 101, finding a set of first time-effective search queries from a search log.

In the present embodiment, the search log may be used to record search queries used by the user during a search. The time-effective search query may be a search query that when used for search, a difference between a publication time of a returned search result and the present time is less than a preset threshold. When a user proceeds search using a search query, if the user desires to obtain a picture of the most recent news event associated with the search query, that is, if the desired search result is published at a time close to the current time, the search query entered by the user may be called a time-effective search query with timeliness requirements. In the present embodiment, some words characterizing the timeliness of the search query may be set in advance, such as "event, occurrence, earnings", etc. When the search query entered by the user contains the timeliness word, the search query can be identified as the first time-effective search query. In the present embodiment, it is also possible to detect the number of the inquiries of the search query entered by the user in a certain period of time. When the number of the inquiring is greater than the preset quantity threshold, the search query may be identified as the first time-effective search query.

Step 102, selecting, based on the set of first time-effective search queries, search queries meeting one of the following selection requirements as candidate time-effective search queries: included in the search log and is semantically associated with the first time-effective search queries in the set of first time-effective search queries; included in the search log and containing a combination of preset keywords.

In the present embodiment, the preset keyword is a word that occurs more than the preset threshold in the set of first time-effective search queries, and the combination of preset keywords is generated by combining the preset keywords. In the present embodiment, search queries associated with the first time-effective search queries in the set of first time-effective search queries can be found out from the search log as a candidate time-effective search queries, based on the set of first time-effective search queries that has been found out. The above association relationship can be: the search queries in the search log are semantically associated with the first time-effective search queries, or the search queries in the search log contain the combination of preset keywords consisting of words that occur more than the preset threshold in the set of first time-effective search queries.

In some alternative implementations of the present embodiment, the search queries semantically associated with the first time-effective search queries in the set of first time-effective search queries in the search log are selected as the candidate time-effective search queries based on the set of first time-effective search queries, including: extracting a first semantic keyword in the first time-effective search queries, and extracting a second semantic keyword of the search queries in the search log, the first semantic keyword being a word with a semantic relevance to the first time-effective search queries greater than a first preset semantic relevance threshold, and the second semantic keyword being a word with a semantic relevance to the search queries in the search log greater than a second preset semantic relevance threshold; determining whether the first semantic keyword matches the second semantic keyword; if yes, selecting the search queries in the search log as the candidate time-effective search queries.

In the present embodiment, the semantic keyword (also referred to as a semantic signature) is a word with the semantic relevance to the corresponding search query greater than the preset relevance threshold, i.e., the semantic keyword may reflect the true semantic meaning of the search query to which it belongs. For example, the core semantic meaning of the search query "how tall is Yao Ming" is what is the height of Yao Ming. Correspondingly, the semantic keywords are "Yao Ming" and "height". In the present embodiment, the first semantic keyword that reflects its true semantic meaning and the second semantic keyword that reflects its true semantic meaning can be respectively extracted from the first time-effective search queries and the search queries in the search log. The proposed first semantic keyword may be added to a preset lexicon for storing the first semantic keywords, and the lexicon may be referred to as a semantic signature dictionary. Then, the second semantic keyword can be matched with the first semantic keyword in the semantic signature dictionary. When the second semantic keyword matches the first semantic keyword, the search queries in the search log may be determined as the candidate time-effective search queries.

Alternatively, since the intermediate result entered by the semantic similarity algorithm is the semantic keyword that can reflect the real semantic meaning of the search queries, extracting the semantic keyword can be realized by the semantic similarity algorithm. The semantic similarity algorithm can adopt the Levenshtein distance algorithm and the Jaccard Coefficient algorithm. The semantic similarity algorithm can be used to extract the first semantic keyword and the second semantic keyword from the first time-effective search queries and the search queries in the search log.

Figure 2:
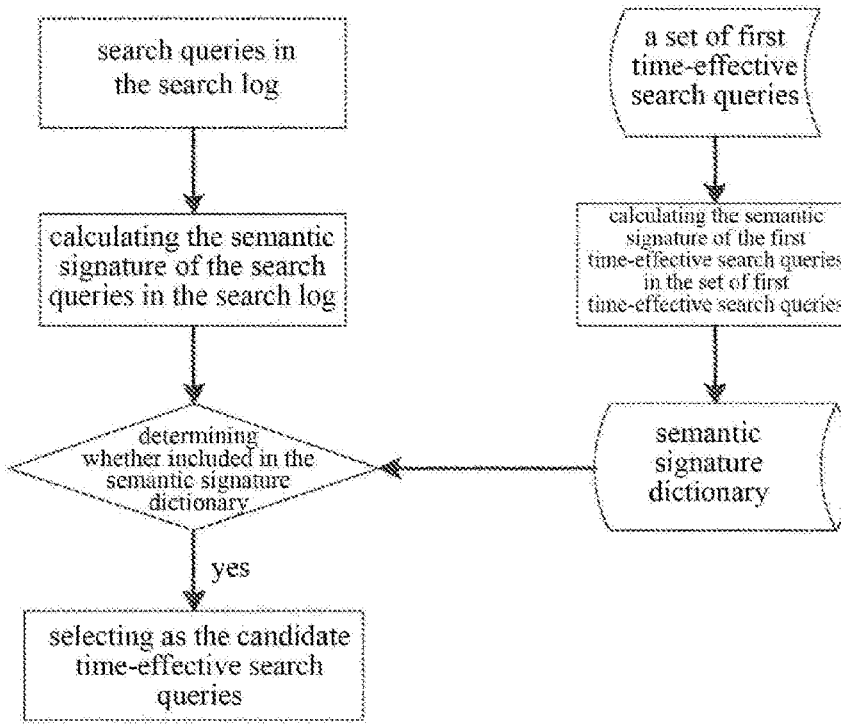
FIG. 2 shows a schematic diagram of searching a candidate time-effective search queries based on the semantic keywords.

Referring to FIG. 2, a schematic diagram of searching the candidate time-effective search queries based on the semantic keywords is shown. In the present embodiment, the first semantic keywords of each of the first time-effective search queries in the set of first time-effective search queries can be extracted in advance, and the semantic signatures of the first time-effective search queries may be aggregated to generate a semantic signature dictionary. Correspondingly, the second semantic keywords of the search query in the search log may be extracted. Then, it can be determined that whether the second semantic keywords of the search query in the search log are in the semantic signature dictionary and whether the search query in the search log is a candidate time-effective search query.

In some alternative implementations of the present embodiment, the combination of preset keywords may be generated by the following steps: finding a co-occurrence keyword from the set of first time-effective search queries to generate a combination of co-occurrence keywords, the co-occurrence keyword being a word that occurs together in the set of first time-effective search queries with occurrences greater than a preset threshold; obtaining a relevance parameter corresponding to the combination of co-occurrence keywords based on a relevance parameter of each of the co-occurrence keywords in the combination of co-occurrence keywords, the relevance parameter indicating a semantic relevance between the co-occurrence keyword and the first time-effective search queries it belongs to; determining whether the relevance parameter corresponding to the combination of co-occurrence keywords is greater than a preset relevance threshold; if yes, determining the combination of co-occurrence keywords as the combination of preset keywords.

In the present embodiment, the co-occurrence keywords may be found out from the set of first time-effective search queries using the following method: firstly, count the number of occurrences (may also be referred to as co-occurrences) of the co-occurrence words in the set of first time-effective search queries for a certain period of time (for example, 1 day). Then, find words with the co-occurrences greater than the preset quantity threshold (may also be referred to as co-occurrence keywords). After the co-occurrence keywords are found out, the semantic relevance (may also be referred to as an importance parameter) of the co-occurrence keywords to the first time-effective search queries may be further calculated, and the importance parameter is normalized and accumulated to obtain an importance value of the combination of co-occurrence keywords. Finally, a combination of co-occurrence keywords with an importance value greater than a certain preset threshold is determined as the combination of preset keywords.

In some alternative implementations of the present embodiment, the preset keyword combination is generated by the following steps: finding an event keyword from the set of first time-effective search queries, wherein the event keyword is a word with occurrences in the set of first time-effective search queries greater than a preset threshold, and the numbers of the first time-effective search queries to which it belongs and the search queries in the search log are both greater than a preset quantity threshold; finding the keyword for combination in the first time-effective search queries containing the event keyword, wherein the keyword for combination is a word with occurrences in the first time-effective search queries containing the event keyword more than a preset threshold; combining the event keyword with the keyword for combination to generate the combination of preset keywords.

In the present embodiment, the event keyword can be found out from the set of first time-effective search queries using the following method: first, calculate the number of occurrences of a word in the set of first time-effective search queries, and at the same time calculate the numbers of the first time-effective search queries where the word located and the search queries in the search log (also referred to as the number of spread). Then, words with occurrences and number of spread both greater than the present quantity threshold are selected as the event keywords. In the present embodiment, after the event keyword is acquired, keyword for combination may be further acquired from the first time-effective search queries containing the event keyword. For example, the occurrences of the words in the first time-effective search queries containing the event keyword may be calculated, and words with occurrences greater than a certain preset quantity threshold is keyword for combination. At last, the keyword for combination and the event keyword is combined to generate the combination of preset keywords.

Taking the news event "Wang Jianlin became the richest man in Asia" as an example, the process of generating the combination of preset keywords is described as follow: first, find the first time-effective search query "Wang Jianlin became the richest man in Asia", "Wang Jianlin regained the richest man in the Mainland and became the richest man in Asia", "Wang Jianlin surpassed Li Ka-shing as the richest man in Asia", "Wang Jianlin the richest man", etc. Then, find the corresponding common news event that can reflect the above time-effective search query from the above first time-effective search query, that is the event keyword of the event "Wang Jianlin became the richest man in Asia", i.e., "Wang Jianlin". After obtaining the event keyword "Wang Jianlin", the above first time-effective search query may be aggregated based on the event keyword to generate a set of first time-effective search queries corresponding to the news event. The keywords for combination "richest", "Asia", "Li Ka-shing", "regained", etc. may be further found out from the set of first time-effective search queries. At last, the event keyword "Wang Jianlin" is combined with the above keywords for combination to generate the preset keyword combinations, i.e., "Wang Jianlin & richest", "Wang Jianlin & Asia", "Wang Jianlin & Li Ka-shing", "Wang Jianlin & regained", etc.

In the present embodiment, the first time-effective search query in the first set of time-effective search queries may also be pre-processed to obtain entity words from the first time-effective search query, and the pre-process operation comprises at least one of the following: word-dividing, POS tagging and named entity identifying; extracting keywords associated with the template word in the preset template from the entity words; combining keywords associated with the template words in the preset template and generate the combination of preset keywords.

In the present embodiment, a template for expressing a time-effective event may be set in advance, for example, a template including template words such as "happen", "earthquake", and "event" may be set in advance. The combination of preset keywords may be generated using the following method: first, the pre-process operations such as word-dividing, POS tagging and named entity identifying are processed on the first time-effective search queries to obtain the entity words, and the relevance between the entity words and the first time-effective search queries is calculated. Then, the entity words not included in the preset template and with a relevance less than the preset relevance threshold are removed from the first time-effective search queries. At last, the first time-effective search queries removed of the entity words that not included in the preset template and with a relevance less than the preset relevance threshold is matched with the preset template, and keywords associated with the template words in the preset template are extracted and combined to generate the combination of preset keywords. Taking the first time-effective search queries "Big fire happened in Beijing wood factory" as an example, the search query may be matched with the set template "happen", so that the entity words "Beijing", "wood factory" located before the template word "happen" and the entity word "big fire" located behind the template word "happen" can be extracted. Based on the above extracted entity words, the word combinations "Beijing-big fire", "wood factory-big fire", "Beijing wood factory-big fire" can be further generated as combination of preset keywords.

Figure 3:
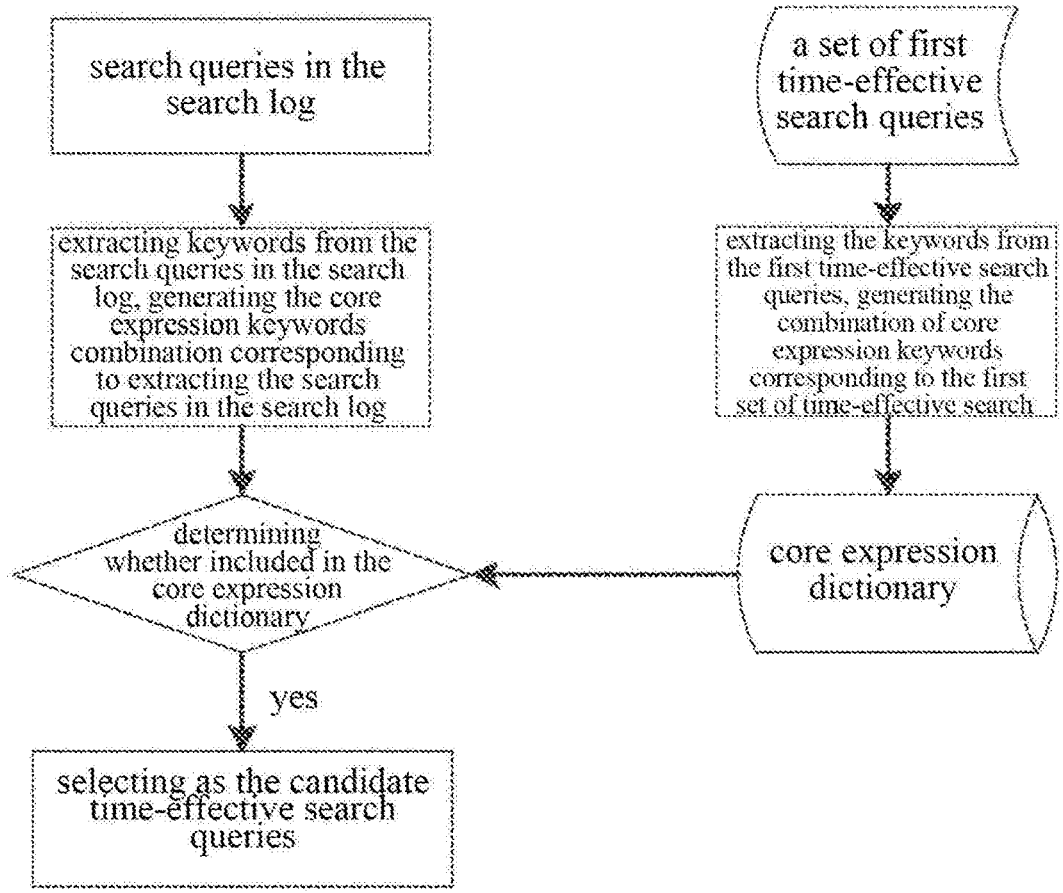
FIG. 3 shows a schematic diagram of search a candidate time-effective search queries based on a core expression dictionary.

Referring to FIG. 3, a schematic diagram of searching a candidate time-effective search queries based on a core expression dictionary is shown. In the present embodiment, by employing the methods such as extracting the co-occurrence keyword, the event keyword, the preset template, etc., the corresponding keyword can be extracted from the set of first time-effective search queries, and the combination of preset keywords corresponding to the set of first time-effective search queries can be generated, the keyword combination is also referred to as the core expression keyword combination. After the core expression keyword combination is generated, it may be stored in the preset core expression dictionary. Correspondingly, by also employing the methods such as extracting the co-occurrence keyword, the event keyword, the preset template, etc., the keyword may be extracted from the search query of the search log, and the core expression keyword combination corresponding to the search from of the search log may be generated. Then, it can be determined whether the core expression keyword combination corresponding to the search query of the search log is in the core expression dictionary, if yes, the search query of the search log is selected as the candidate time-effective search query.

Step 103, processing the candidate time-effective search queries to obtain a second time-effective search queries.

In the present embodiment, after the candidate time-effective search queries is obtained, it may be further processed to obtain the second time-effective search queries. The processing operation may be: removing the candidate time-effective search queries with a semantic similarity to the first time-effective search queries less than the preset threshold from the candidate time-effective search queries, setting the candidate time-effective search queries with a semantic similarity to the first time-effective search queries greater than the preset threshold in the candidate time-effective search queries, as the second time-effective search queries.

In the present embodiment, the processing operation may also be: removing the word with a semantic relevance to the candidate time-effective search queries less than a preset correlation threshold from words included in the candidate time-effective search queries, then determining the candidate time-effective search queries removed of the words with the semantic relevance to the candidate time-effective search queries less than the preset correlation threshold, as the second time-effective search queries.

Step 104, performing search with a second time-effective search query, when a search query entered by the user matches the second time-effective search query.

In the present embodiment, when the user proceeds a search, it is possible to determine whether the second time-effective search query is included in the search query entered by the user. When the search query entered by the user comprises the second time-effective search query, the second time-effective search queries may be used to initiate the searching to acquire search results closer to the present time. For example, the user desires to acquire news pictures related to recent news event. When the search query entered by the user comprises the second time-effective search query consisting of keywords characterizing the news event, the second time-effective search query may be used to initiate the search to return with news pictures regarding the news event closer to the present time for the user.

Referring to FIG. 4, a flow 400 of another embodiment of the search method according to the present disclosure is shown. The method comprises the following steps:

Step 401, finding the set of first time-effective search queries from the search log.

In the present embodiment, some words characterizing the timeliness of the search query may be set in advance. When the search query entered by the user contains the timeliness word, the search query can be identified as the first time-effective search query. It is also possible to detect the number of the inquiries of the search query entered by the user in a certain period of time. When the number of the inquiries is greater than the preset quantity threshold, the search query may be identified as the first time-effective search query.

Step 402, selecting, based on the set of first time-effective search queries, search queries meeting one of the following selection requirements as candidate time-effective search queries: included in the search log and semantically associated with the first time-effective search queries in the set of first time-effective search queries; included in the search log and containing a combination of preset keywords.

In the present embodiment, a search query associated with the first time-effective search query in the set of first time-effective search queries can be found out from the search log as a candidate time-effective search query, based on the set of first time-effective search queries that has been found out. The above association relationship can be: the search query in the search log is semantically associated with the first time-effective search queries, or the search query in the search log contains a combination of preset keyword consisting of words that occur more than the preset threshold in the set of first time-effective search queries.

Step 403, obtaining the second time-effective search queries from the candidate time-effective search queries, based on the semantic similarity and the historical time-effective search words and a preset verify word.

In the present embodiment, when the candidate time-effective search queries and the first time-effective search queries in the set of first time-effective search queries are semantically associated, it is possible to calculate the semantic similarity between the candidate time-effective search queries and the first time-effective search queries, remove the candidate time-effective search queries with a semantic similarity to the first time-effective search queries less than a preset threshold from the candidate time-effective search queries, determine the candidate time-effective search queries removed of the candidate time-effective search queries with the semantic relevance to the first time-effective search queries less than the preset threshold as the second time-effective search queries. In the present embodiment, when the candidate time-effective search queries is semantically associated with the first time-effective search queries of the set of first time-effective search queries, i.e. when the semantic signature extracted from the candidate time-effective search queries is identical to the semantic signature extracted from the first time-effective search queries, the semantic similarity (may also be referred to as the literal similarity) between the candidate time-effective search queries and the first time-effective search queries may be further calculated, and the candidate time-effective search queries with a literal similarity greater than a certain preset threshold is determined as the second time-effective search queries.

In the present embodiment, when the combination of preset keywords is included in the candidate time-effective search queries, a word matching a preset verify word and a historical time-effective search word from words included in the candidate time-effective search queries may be further removed. Then, the candidate time-effective search queries removed of the words matching the preset verify word and the historical time-effective search words is determined as the second time-effective search queries. In the present embodiment, the historical time-effective search words maybe keywords such as co-occurrence keywords, event keywords, etc., which are extracted from the historically identified time-effective search queries. The preset verify word may be a word that does not have a timeliness requirement or can not express the core semantic meaning of the event, that is, a word with a relevance to the first time-effective search queries less than the preset threshold.

In the present embodiment, by considering the conditions met by the candidate time-effective search queries, and further verifying the candidate time-effective search queries with the verifying method corresponding to the conditions met by the candidate time-effective search queries, and lastly obtaining the second time-effective search queries from the search log, a new time-effective search query is recalled from the search log. Thus, the accuracy rate of identifying the time-effective search query is ensured and the recall rate of identifying the time-effective search query is improved during the process of identifying the search queries in the user's search log.

Step 404, searching with the second time-effective search query, when a search query entered by the user matches the second time-effective search query.

In the present embodiment, when the user proceeds a search, it is possible to determine whether the second time-effective search query is included in the search query entered by the user. When the search query entered by the user comprises the second time-effective search query, the second time-effective search query may be used to initiate the search to acquire search results closer to the present time.

Referring to FIG. 5, a schematic diagram of an embodiment of the search apparatus according to the present disclosure is shown. As shown in FIG. 5, the apparatus 500 comprises: a finding unit 501, a selection unit 502, a processing unit 503 and a search unit 504. The finding unit 501 is configured to find a set of first time-effective search queries from a search log, wherein the search log is used to record search queries used by a user during a search, and a time-effective search query is a search query that when used for search, a difference between a publication time of a returned search result and the present time is less than a preset time difference threshold. The selection unit 502 is configured to select, based on the set of first time-effective search queries, search queries meeting one of the following selection requirements as candidate time-effective search queries: included in the search log and semantically associated with the first time-effective search queries in the set of first time-effective search queries; included in the search log and containing a combination of preset keywords, wherein preset keywords are words with occurrences in the set of first time-effective search queries more than a preset threshold, and the combination of preset keywords is generated by combining the preset keywords. The processing unit 503 is configured to process the candidate time-effective search queries to obtain second time-effective search queries, the processing operation including one of the following: removing, from the candidate time-effective search queries, candidate time-effective search queries having semantic similarities with respect to the first time-effective search queries less than a preset threshold; removing, from a candidate time-effective search query, words with semantic relevance less than a preset correlation threshold with respect to the candidate time-effective search query. The search unit 504 is configured to perform search with a second time-effective search query, when a search query entered by the user matches the second time-effective search query.

In some alternative implementations of the present embodiment, the selection unit 502 comprises: an extraction subunit (not shown), configured to extract a first semantic keyword in the first time-effective search queries, and extract a second semantic keyword of a search query in the search log, the first semantic keyword being a word with a semantic relevance to the first time-effective search queries greater than a first preset semantic relevance threshold, and the second semantic keyword being a word with a semantic relevance to the search queries in the search log greater than a second preset semantic relevance threshold; a determining subunit (not shown), configured to determine whether the first semantic keyword matches the second semantic keyword; and a candidate time-effective search queries selection subunit (not shown), configured to select the search query in the search log as the candidate time-effective search query, when the first semantic keyword matches the second semantic keyword.

In some alternative implementations of the present embodiment, the apparatus 500 further comprises: a first combination of preset keywords generating unit (not shown), the first combination of preset keywords generating unit including: a co-occurrence keyword finding subunit (not shown), configured to find co-occurrence keywords from the set of first time-effective search queries to generate a combination of co-occurrence keywords, the co-occurrence keywords being words that occur together in the set of first time-effective search queries with occurrences greater than a preset threshold; a relevance calculation subunit (not shown), configured to obtain a relevance parameter corresponding to the combination of co-occurrence keywords based on a relevance parameter of each of the co-occurrence keywords in the combination of co-occurrence keywords, wherein the relevance parameter is for indicating a semantic relevance between the co-occurrence keywords and the first time-effective search queries they belong to; a relevance determining subunit (not shown), configured to determine whether the relevance parameter corresponding to the combination of co-occurrence keywords is greater than a preset relevance threshold; and a first keyword combination generating subunit (not shown), configured to the combination of co-occurrence keywords as the combination of preset keywords, when the relevance parameter corresponding to the combination of co-occurrence keywords is greater than a preset relevance threshold.

In some alternative implementations of the present embodiment, the apparatus 500 further comprises: a second combination of preset keywords generating unit (not shown), the second combination of preset keywords generating unit including: an event keyword finding subunit (not shown), configured to find an event keyword from the set of first time-effective search queries, wherein the event keyword is a word with occurrences in the set of first time-effective search queries greater than a preset threshold, and the numbers of the first time-effective search queries to which it belongs and the search queries in the search log are both greater than a preset quantity threshold; a combination keyword finding subunit (not shown), configured to find a keyword for combination in the first time-effective search queries containing the event keyword, wherein the keyword for combination is a word with occurrences in the first time-effective search queries containing the event keyword more than a preset threshold; and a second keyword combination generating subunit (not shown), configured to combine the event keyword with the keyword for combination to generate the combination of preset keywords.

In some alternative implementations of the present embodiment, the processing unit 503 comprises: a semantic similarity calculation subunit (not shown), configured to calculate a semantic similarity between the candidate time-effective search queries and the first time-effective search queries, when the candidate time-effective search queries and the first time-effective search queries in the set of first time-effective search queries are semantically associated; a first removal subunit (not shown), configured to remove, from the candidate time-effective search queries, the candidate time-effective search queries with semantic similarities to the first time-effective search queries less than a preset threshold; and a first determining subunit (not shown), configured to determine the candidate time-effective search queries removed of the candidate time-effective search queries with the semantic relevance to the first time-effective search queries less than the preset threshold as the second time-effective search queries.

In some alternative implementations of the present embodiment, the processing unit 503 further comprises: a second removal subunit (not shown), configured to remove, from the candidate time-effective search queries, words matching a preset verify word and a historical time-effective search word, when the combination of preset keywords is included in the candidate time-effective search queries, the preset verify word being a word with a semantic relevance to the first time-effective search queries less than a preset threshold; and a second determining subunit (not shown), configured to determine the candidate time-effective search queries removed of the words matching the preset verify word and the historical time-effective search word as the second time-effective search queries.

It may be appreciated by those skilled in the art that the above search apparatus 500 also comprises some other well-known structures, such as processors, storages, etc., which are not shown in FIG. 5 for unnecessarily obscuring the embodiments of the present disclosure.

The unit or module referred to in the embodiments of the present disclosure may be implemented by software, or may be implemented by hardware. The described unit or module may also be provided in a processor, for example, may be described as: a processor including a finding unit, a selection unit, a processing unit, and a search unit. Where the name of the units does not in any case constitute a limitation on the unit itself, for example, the finding unit may also be described as "a unit configured to find a set of first time-effective search queries from the search log".

Figure 6:
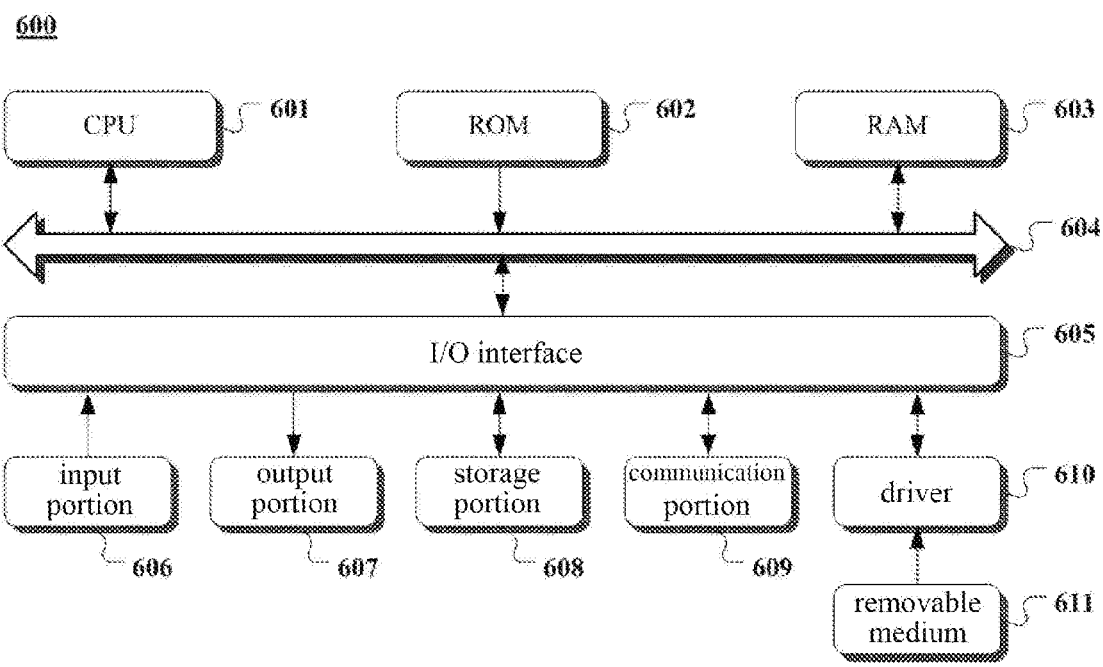
FIG. 6 is a schematic structural diagram of a computer system provided by the embodiments of the present disclosure.

Referring to FIG. 6, a schematic structural diagram of a computer system 600 adapted to implement a server of the embodiments of the present application is shown.

As shown in FIG. 6, the computer system 600 comprises a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure comprises a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present application.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising an finding unit, a selection unit, a processing unit, and a search unit, where the names of these units or modules are not considered as a limitation to the units or modules. For example, the finding unit may also be described as "a unit for finding a set of first time-effective search queries from a search log."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. One or more processors perform the search method described here with the one or more programs.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A search method, comprising:
   finding a set of first time-effective search queries from a search log, wherein the search log is used to record search queries used by a user during a search, and a time-effective search query is a search query that when used for search, a difference between a publication time of a returned search result and the present time is less than a preset time difference threshold;
   selecting, based on the set of first time-effective search queries, search queries meeting one of the following selection requirements as candidate time-effective search queries: included in the search log and semantically associated with the first time-effective search queries in the set of first time-effective search queries; included in the search log and containing a combination of preset keywords, wherein the preset keywords are words with occurrences in the set of first time-effective search queries greater than a preset threshold, and the combination of preset keywords is generated by combining the preset keywords;
   processing the candidate time-effective search queries to obtain second time-effective search queries, the processing including one of the following: removing, from the candidate time-effective search queries, candidate time-effective search queries having semantic similarities with respect to the first time-effective search queries less than a preset threshold; removing, from a candidate time-effective search query, words with semantic relevance less than a preset correlation threshold with respect to the candidate time-effective search query; and
   performing search with a second time-effective search query, when a search query entered by the user matches the second time-effective search query;
   wherein the selecting, based on the set of first time-effective search queries, search queries included in the search log and semantically associated with the first time-effective search queries in the set of first time-effective search queries as a candidate time-effective search queries, comprises:
   extracting a first semantic keyword in the first time-effective search queries, and extracting a second semantic keyword of a search query in the search log, the first semantic keyword being a word with a semantic relevance to the first time-effective search queries greater than a first preset semantic relevance threshold, and the second semantic keyword being a word with a semantic relevance to the search queries in the search log greater than a second preset semantic relevance threshold;
   determining whether the first semantic keyword matches the second semantic keyword; and
   in response to determining that the first semantic keyword matches the second semantic keyword, selecting the search query in the search log as the candidate time-effective search query; and
   wherein the combination of preset keywords is generated by the following steps:
   finding an event keyword from the set of first time-effective search queries, wherein the event keyword is a word with occurrences in the set of first time-effective search queries greater than a preset threshold, and the numbers of the first time-effective search queries to which the word belongs and the search queries in the search log are both greater than a preset quantity threshold;
   finding a keyword for combination in the first time-effective search queries containing the event keyword, wherein the keyword for combination is a word with occurrences in the first time-effective search queries containing the event keyword more than a preset threshold; and
   combining the event keyword with the keyword for combination to generate the combination of preset keywords.

2. The method according to claim 1, wherein the combination of preset keywords is generated by:
   finding co-occurrence keywords from the set of first time-effective search queries to generate a combination of co-occurrence keywords, the co-occurrence keywords being words that occur together in the set of first time-effective search queries with occurrences greater than a preset threshold;
   obtaining a relevance parameter corresponding to the combination of co-occurrence keywords based on a relevance parameter of each of the co-occurrence keywords in the combination of co-occurrence keywords, wherein the relevance parameter is for indicating a semantic relevance between the co-occurrence keywords and the first time-effective search queries they belong to;

determining whether the relevance parameter corresponding to the combination of co-occurrence keywords is greater than a preset relevance threshold; and in response to determining that the relevance parameter corresponding to the combination of co-occurrence keywords is greater than a preset relevance threshold, determining the combination of co-occurrence keywords as the combination of preset keywords.

3. The method according to claim 2, wherein the processing the candidate time-effective search queries to obtain second time-effective search queries comprises:

calculating a semantic similarity between the candidate time-effective search queries and the first time-effective search queries, when the candidate time-effective search queries and the first time-effective search queries in the set of first time-effective search queries are semantically associated;

removing, from the candidate time-effective search queries, the candidate time-effective search queries with semantic similarities to the first time-effective search queries less than a preset threshold; and determining candidate time-effective search queries after the candidate time-effective search queries with the semantic similarities to the first time-effective search queries less than the preset threshold are removed as the second time-effective search queries.

4. The method according to claim 1, wherein the processing the candidate time-effective search queries to obtain second time-effective search queries comprises:

calculating a semantic similarity between the candidate time-effective search queries and the first time-effective search queries, when the candidate time-effective search queries and the first time-effective search queries in the set of first time-effective search queries are semantically associated;

removing, from the candidate time-effective search queries, the candidate time-effective search queries with semantic similarities to the first time-effective search queries less than a preset threshold; and determining candidate time-effective search queries after the candidate time-effective search queries with the semantic similarities to the first time-effective search queries less than the preset threshold are removed as the second time-effective search queries.

5. The method according to claim 4, wherein the processing the candidate time-effective search queries to obtain the second time-effective search queries comprises:

removing, from the candidate time-effective search queries, words matching a preset verify word and a historical time-effective search word, when the combination of preset keywords is included in the candidate time-effective search queries, the preset verify word being a word with a semantic relevance to the first time-effective search queries less than a preset threshold; and determining candidate time-effective search queries, after the words matching the preset verify word and the historical time-effective search word are removed, as the second time-effective search queries.

6. A search apparatus, comprising:

at least one processor; and a memory storing instructions, the instructions when executed by the at least one processor, cause the at least one processor to perform operations, the operations comprising:

finding a set of first time-effective search queries from a search log, wherein the search log is used to record search queries used by a user during a search, and a time-effective search query is a search query that when used for search, a difference between a publication time of a returned search result and the present time is less than a preset time difference threshold;

selecting, based on the set of first time-effective search queries, search queries meeting one of the following selection requirements as candidate time-effective search queries: included in the search log and semantically associated with the first time-effective search queries in the set of first time-effective search queries; included in the search log and containing a combination of preset keywords, wherein preset keywords are words with occurrences in the set of first time-effective search queries more than a preset threshold, and the combination of preset keywords is generated by combining the preset keywords;

processing the candidate time-effective search queries to obtain second time-effective search queries, the processing operation including one of the following: removing, from the candidate time-effective search queries, candidate time-effective search queries having semantic similarities with respect to the first time-effective search queries less than a preset threshold; removing, from a candidate time-effective search query, words with semantic relevance less than a preset correlation threshold with respect to the candidate time-effective search query; and performing search with a second time-effective search query, when a search query entered by the user matches the second time-effective search query;

wherein the selecting, based on the set of first time-effective search queries, search queries included in the search log and semantically associated with the first time-effective search queries in the set of first time-effective search queries as a candidate time-effective search queries, comprises:

extracting a first semantic keyword in the first time-effective search queries, and extracting a second semantic keyword of a search query in the search log, the first semantic keyword being a word with a semantic relevance to the first time-effective search queries greater than a first preset semantic relevance threshold, and the second semantic keyword being a word with a semantic relevance to the search queries in the search log greater than a second preset semantic relevance threshold;

determining whether the first semantic keyword matches the second semantic keyword; and in response to determining that the first semantic keyword matches the second semantic keyword, selecting the search query in the search log as the candidate time-effective search query; and wherein the combination of preset keywords is generated by the following steps:

finding an event keyword from the set of first time-effective search queries, wherein the event keyword is a word with occurrences in the set of first time-effective search queries greater than a preset threshold, and the numbers of the first time-effective search queries to which the word belongs and the search queries in the search log are both greater than a preset quantity threshold;

finding a keyword for combination in the first time-effective search queries containing the event keyword, wherein the keyword for combination is a word with occurrences in the first time-effective search queries containing the event keyword more than a preset threshold; and combining the event keyword with the keyword for combination to generate the combination of preset keywords.

7. The apparatus according to claim 6, wherein the combination of preset keywords is generated by:

finding co-occurrence keywords from the set of first time-effective search queries to generate a combination of co-occurrence keywords, the co-occurrence keywords being words that occur together in the set of first time-effective search queries with occurrences greater than a preset threshold;

obtaining a relevance parameter corresponding to the combination of co-occurrence keywords based on a relevance parameter of each of the co-occurrence keywords in the combination of co-occurrence keywords, wherein the relevance parameter is for indicating a semantic relevance between the co-occurrence keywords and the first time-effective search queries they belong to;

determining whether the relevance parameter corresponding to the combination of co-occurrence keywords is greater than a preset relevance threshold; and determining the combination of co-occurrence keywords as the combination of preset keywords, in response to determining that the relevance parameter corresponding to the combination of co-occurrence keywords is greater than a preset relevance threshold.

8. The apparatus according to claim 7, wherein the combination of preset keywords is generated by:

calculating a semantic similarity between the candidate time-effective search queries and the first time-effective search queries, when the candidate time-effective search queries and the first time-effective search queries in the set of first time-effective search queries are semantically associated;

removing, from the candidate time-effective search queries, the candidate time-effective search queries with semantic similarities to the first time-effective search queries less than a preset threshold; and determining the candidate time-effective search queries after the candidate time-effective search queries with the semantic similarities to the first time-effective search queries less than the preset threshold are removed as the second time-effective search queries.

9. The apparatus according to claim 6, wherein the processing the candidate time-effective search queries to obtain second time-effective search queries comprises:

calculating a semantic similarity between the candidate time-effective search queries and the first time-effective search queries, when the candidate time-effective search queries and the first time-effective search queries in the set of first time-effective search queries are semantically associated;

removing, from the candidate time-effective search queries, the candidate time-effective search queries with semantic similarities to the first time-effective search queries less than a preset threshold; and determining candidate time-effective search queries after the candidate time-effective search queries with the semantic similarities to the first time-effective search queries less than the preset threshold are removed as the second time-effective search queries.

10. The apparatus according to claim 9, wherein the processing the candidate time-effective search queries to obtain the second time-effective search queries comprises:

removing, from the candidate time-effective search queries, words matching a preset verify word and a historical time-effective search word, when the combination of preset keywords is included in the candidate time-effective search queries, the preset verify word being a word with a semantic relevance to the first time-effective search queries less than a preset threshold; and determining the candidate time-effective search queries, after the words matching the preset verify word and the historical time-effective search word are removed, as the second time-effective search queries.

* * * * *